(12) United States Patent
Matsuoka et al.

(10) Patent No.: US 6,845,626 B2
(45) Date of Patent: Jan. 25, 2005

(54) REFRIGERATION APPARATUS

(75) Inventors: Hiromune Matsuoka, Sakai (JP); Junichi Shimoda, Sakai (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 10/333,055

(22) PCT Filed: May 20, 2002

(86) PCT No.: PCT/JP02/04866
§ 371 (c)(1),
(2), (4) Date: Jan. 16, 2003

(87) PCT Pub. No.: WO02/103265
PCT Pub. Date: Dec. 27, 2002

(65) Prior Publication Data
US 2003/0172665 A1 Sep. 18, 2003

(30) Foreign Application Priority Data
May 22, 2001 (JP) ........................ 2001-152091

(51) Int. Cl.$^7$ .............................. F25B 45/00
(52) U.S. Cl. .......................... 62/149; 62/292
(58) Field of Search ................... 62/149, 292, 298, 62/77

(56) References Cited

U.S. PATENT DOCUMENTS

| | | | | |
|---|---|---|---|---|
| 4,591,839 A | * | 5/1986 | Charboneau et al. | 340/620 |
| 4,856,288 A | * | 8/1989 | Weber | 62/129 |
| 4,967,567 A | * | 11/1990 | Proctor et al. | 62/127 |
| 5,076,063 A | * | 12/1991 | Kamegasawa et al. | 62/48.2 |
| 5,201,188 A | * | 4/1993 | Sakuma | 62/149 |
| 6,264,431 B1 | * | 7/2001 | Triezenberg | 417/36 |

FOREIGN PATENT DOCUMENTS

| | | |
|---|---|---|
| JP | 59-77275 | 5/1984 |
| JP | 62-96529 | 6/1987 |
| JP | 62-130371 U | 8/1987 |
| JP | 08-121848 A | 5/1996 |
| JP | 08-145510 A | 6/1996 |
| JP | 10-30853 A | 2/1998 |
| JP | 2000-65411 A | 3/2000 |
| JP | 2000-356388 A | 12/2000 |
| JP | 2001-21242 A | 1/2001 |

* cited by examiner

*Primary Examiner*—Melvin Jones
(74) *Attorney, Agent, or Firm*—Shinjyu Global IP Counselors, LLP

(57) ABSTRACT

This invention makes it possible to charge a refrigeration apparatus with the amount of refrigerant that the refrigeration apparatus requires at the time of onsite installation. As a result, the optimum refrigerant charging amount can always be obtained. The refrigeration apparatus is provided with a refrigeration cycle in which an outdoor unit equipped with a compressor, a condenser, and a receiver is connected to an indoor unit equipped with an expansion valve and an evaporator via a liquid pipe and a gas pipe. The refrigeration cycle is charged with refrigerant while a refrigerant charging operation state is created in which the liquid pipe that connects the outdoor unit to the indoor unit is filled with liquid refrigerant having a prescribed density. Refrigerant charging ends when, during the refrigerant charging operation, it is detected that the level of the liquid inside the receiver has reached a prescribed level.

7 Claims, 3 Drawing Sheets

REFRIGERATION APPARATUS

TECHNICAL FIELD

The present invention relates to a split-type refrigeration apparatus. More specifically, the present invention relates to a method of setting and determining the refrigerant charging amount when a split-type refrigeration apparatus is charged with refrigerant onsite.

BACKGROUND ART

Split-type refrigeration apparatuses comprising an outdoor unit equipped with a compressor, a condenser, and a receiver and an indoor unit equipped with an expansion valve and an evaporator are well known. The refrigerant charging of split-type refrigeration apparatuses configured in this manner has conventionally been handled by charging the outdoor unit with a prescribed amount of refrigerant in advance and charging additional refrigerant onsite in accordance with the length of the piping connecting the outdoor unit to the indoor unit when the apparatus is installed.

When the refrigerant charging amount is determined onsite during installation, the performance and reliability of the equipment becomes dependent on the quality of the installation and, in some cases, the maximum capacity of the refrigeration apparatus cannot be realized.

DISCLOSURE OF THE INVENTION

The object of the present invention is to make it possible to always obtain the optimum refrigerant charging amount by making it possible to charge the amount of refrigerant that the refrigeration apparatus requires at the time of the onsite installation.

The refrigeration apparatus described in the first aspect of the present invention is equipped with a refrigerant circuit—in which a compressor, a heat-source-side heat exchanger, a receiver, an expansion valve, a liquid pipe, a utilization-side heat exchanger, and a gas pipe are connected together—and a liquid level detecting means. The receiver collects liquid refrigerant. The liquid pipe connects the receiver to the expansion valve. The gas pipe connects the utilization-side heat exchanger to the compressor. The liquid level detecting means detects if the surface of the liquid inside the receiver has reached a prescribed level.

Since this refrigeration apparatus is equipped with a liquid level detecting means, it can be detected if the surface of the liquid inside the receiver has reached a prescribed level during refrigerant charging operation when the refrigerant circuit is charged with refrigerant.

Thus, for example, if the apparatus is configured such that it can be detected when the liquid surface reaches a maximum liquid level (Lmax), then overcharging of refrigerant into the refrigerant circuit can be detected. Furthermore, even when the length of the liquid pipe, gas pipe, and other connecting piping cannot be measured, the required amount of refrigerant charging can be obtained easily by detecting when a prescribed liquid level (L0) is obtained inside the receiver.

The refrigeration apparatus described in the second aspect of the present invention is a refrigeration apparatus as recited in the first aspect, wherein the liquid level detecting means comprises a bypass circuit and a temperature detecting means. The bypass circuit means connects the receiver and the suction side of the compressor and includes an ON/OFF valve and a pressure reducing mechanism. The temperature detecting means detects the temperature of the refrigerant flowing in the bypass circuit.

Since the liquid level detecting means of this refrigeration apparatus comprises a temperature detecting means and a bypass circuit that includes an ON/OFF valve and a pressure reducing mechanism, the liquid level can be detected reliably at low cost.

The refrigeration apparatus described in the third aspect of the present invention is a refrigeration apparatus as recited in the first or second aspect, wherein the following are further provided: a refrigerant charging operation control means that executes charging of the refrigerant circuit with refrigerant while creating a refrigerant charging operation state in which the liquid pipe of the refrigerant circuit is filled with liquid refrigerant having a prescribed density; and a refrigerant charging ending means that ends the refrigerant charging executed by the refrigerant charging operation control means based on the detection signal from the liquid level detecting means.

With this refrigeration apparatus, the refrigerant circuit is charged with refrigerant while a refrigerant charging operation state is created in which the refrigerant circuit is filled with liquid refrigerant having a prescribed density. During this refrigerant charging operation, refrigerant charging is ended when it is detected that the liquid surface inside the receiver has reached a prescribed level. Thus, the reliability of the refrigerant charging process is improved.

The refrigeration apparatus described in the fourth aspect of the present invention is a refrigeration apparatus as recited in the third aspect, wherein the heat-source-side heat exchanger is an air-cooled heat exchanger that uses air supplied from an outdoor fan as the heat source. The refrigerant charging operation control means controls the outdoor fan such that the condensation pressure of the heat-source-side heat exchanger (which acts as a condenser) achieves a prescribed value and controls the opening of the expansion valve such that a prescribed degree of superheating can be imparted to the refrigerant at the outlet of the utilization-side heat exchanger (which acts as an evaporator).

With this refrigeration apparatus, collection of more liquid refrigerant than is necessary in the heat-source-side heat exchanger (which acts as the condenser) is avoided and the gas pipe disposed between the utilization-side heat exchanger and the suction side of the compressor is filled with gaseous refrigerant. Therefore, a refrigerant charging operation state in which the liquid piping is filled with liquid refrigerant having a prescribed density can be achieved easily.

BRIEF DESCRIPTIONS OF THE DRAWINGS

BEST MODES OF WORKING THE INVENTION

Below, preferred embodiments of the present invention are described while referring to the attached drawings.

Figure 1:
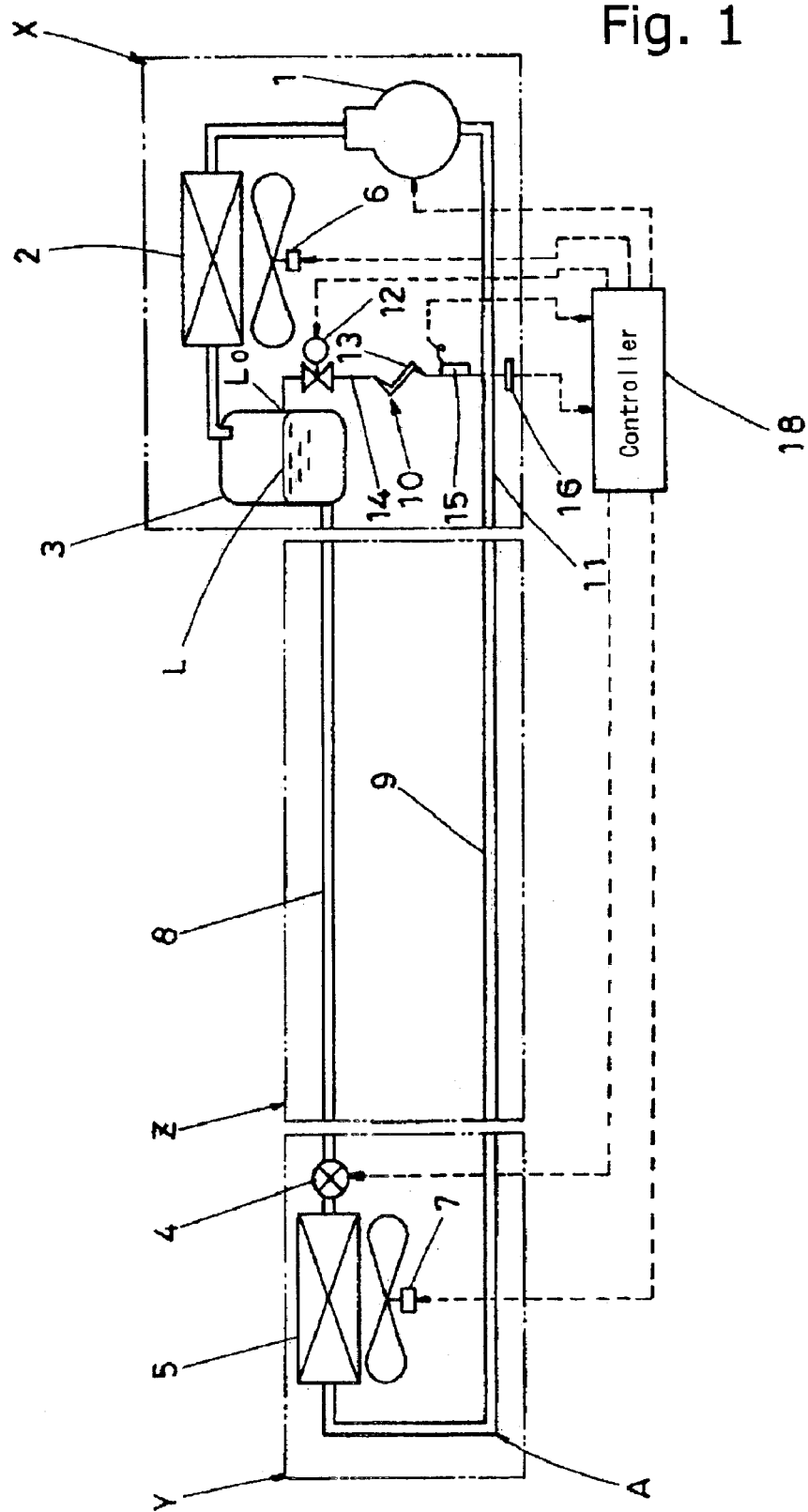
FIG. 1($a$) is a block diagram showing the refrigeration circuit of an embodiment of a refrigeration apparatus in accordance with the present invention.

As shown in FIG. 1, this split-type refrigeration apparatus comprises an outdoor unit X and an indoor unit Y. The outdoor unit is equipped with a compressor 1, an air-cooled condenser 2 (heat-source-side heat exchanger) combined with an outdoor fan 6, and a receiver 3. The indoor unit is equipped with an expansion valve 4 and an evaporator 5 (utilization-side heat exchanger). The outdoor unit and indoor unit are connected by a liquid pipe 8 and a gas pipe 9 to form a refrigeration cycle A (refrigerant circuit). Liquid pipe 8 and gas pipe 9 include an onsite piping section Z. Item 7 is an indoor fan.

Figure 2:
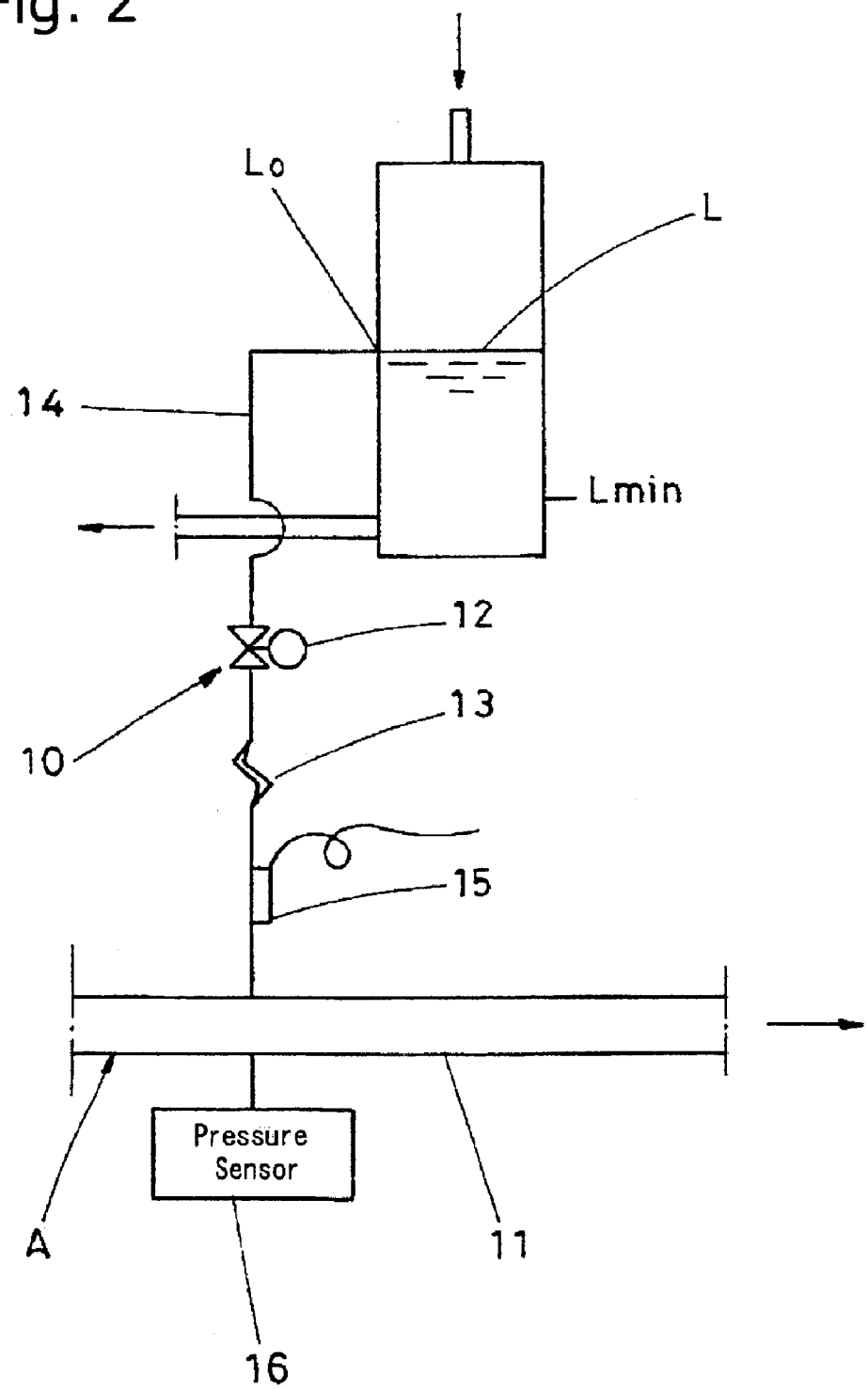
FIG. 2 is an enlarged view of key components of the embodiment of a refrigeration apparatus in accordance with the present invention.

As shown in FIG. 2, receiver 3 is equipped with a liquid level detecting means or member 10 that detects if the liquid surface level L has reached a prescribed level L0 inside receiver 3. In this embodiment, liquid level detecting member 10 comprises a bypass circuit 14 and a thermistor 15. The bypass circuit connects the prescribed level L0 in receiver 3 with the suction pipe 11 of compressor 1 and has a solenoid ON/OFF valve 12 that is actuated so as to open when the liquid level is detected to be at the prescribed level and a capillary tube 13 that acts as a pressure reducing mechanism. The thermistor acts as a temperature detecting means that detects the temperature of the refrigerant flowing in bypass circuit 14. The prescribed level L0 is the surface level of the liquid refrigerant collected in receiver 2 when the refrigerant is needed the least (i.e., when the amount of circulating refrigerant is the smallest) during air-conditioning operation. The prescribed level is set such that the liquid level L inside receiver 3 does not fall below a minimum level Lmin when the refrigerant is needed the most (i.e., when the amount of circulating refrigerant is the largest) during air-conditioning operation. Item 16 is a pressure sensor that detects the suction pressure.

Refrigeration cycle A is equipped with a controller 18 that receives detection signals from thermistor 15 and pressure sensor 16 and sends control signals to compressor 1, expansion valve 4, outdoor fan 6, indoor fan 7 and solenoid ON/OFF valve 12.

Controller 18 has a function whereby it acts as a refrigerant charging operation control means that executes charging of refrigeration cycle A with refrigerant while creating a refrigerant charging operation state in which liquid pipe 8 is filled with liquid refrigerant having a prescribed density and a function whereby it acts as a refrigerant charging ending means that ends the refrigerant charging executed by the refrigerant charting operation control means based on the detection signal from liquid level detecting means 10. In the embodiment, the refrigerant charging operation control means controls outdoor fan 6 such that the condensation pressure at condenser 2 becomes a prescribed value (i.e., such that more liquid refrigerant than is necessary does not collect in condenser 2) and controls the opening of expansion valve 4 such that a prescribed degree of superheating can be imparted to the refrigerant at the outlet of evaporator 5 (i.e., such that the gas pipe 9 disposed between evaporator 5 and compressor 1 is filled with gaseous refrigerant). Here, the refrigerant is charged through a shut-off valve (not shown in the drawings) that connects the outdoor unit X to the onsite connection piping section Z.

Next, the operation of the refrigeration apparatus during refrigerant charging is explained.

The control signal from controller 18 controls outdoor fan 6 such that the condensation pressure at condenser 2 becomes a prescribed value (i.e., such that more liquid refrigerant than is necessary does not collect in condenser 2) and controls the opening of expansion valve 4 such that a prescribed degree of superheating can be imparted to the refrigerant at the outlet of evaporator 5 (i.e., such that the gas pipe 9 disposed between evaporator 5 and compressor 1 is filled with gaseous refrigerant). As a result, refrigeration cycle A is charged with refrigerant while a refrigerant charging operation state exists in which liquid pipe 8 is filled with liquid refrigerant having a prescribed density. During this charging, solenoid ON/OFF valve 12 is in the opened state.

As the system is charged, the amount of refrigerant circulating in refrigerant cycle A increases gradually and the liquid level L of the refrigerant inside receiver 3 rises. When the liquid level L reaches prescribed level L0, which is the inlet to bypass circuit 14, saturated liquid refrigerant flows into bypass circuit 14. Up until this point, the saturated gas refrigerant filling the gas phase section of receiver 3 was flowing into bypass circuit 14 and thermistor 15 was detecting the temperature of this gaseous refrigerant.

When saturated liquid refrigerant flows into bypass circuit 14 as just described, its pressure is reduced by capillary tube 13 and it evaporates, causing the temperature detected by thermistor 15 to decrease rapidly. Thus, the fact that the liquid level has reached the aforementioned prescribed level can be detected by detecting this rapid decrease in temperature and refrigerant charging can be ended at the point in time when the liquid level is detected to be at the prescribed level.

With this method of refrigerant charging, refrigeration cycle A is charged with the required amount of refrigerant. The required amount of refrigerant can be charged even if the length of the connecting pipes cannot be measured onsite and the reliability of the equipment is improved.

Furthermore, outdoor fan 6 is controlled such that the condensation pressure at condenser 2 becomes a prescribed value (i.e., such that more liquid refrigerant than is necessary does not collect in condenser 2) and the opening of expansion valve 4 is controlled such that a prescribed degree of superheating can be imparted to the refrigerant at the outlet of evaporator 5 (i.e., such that the gas pipe 9 disposed between evaporator 5 and compressor 1 is filled with gaseous refrigerant). As a result, a refrigerant charging operation state in which liquid pipe 8 is filled with liquid refrigerant having a prescribed density can be created easily.

In order to prevent degradation of the COP, it is critical to select the capacity of receiver 3 such that refrigerant will not overflow out of receiver 3 during the operating state in which the amount of surplus refrigerant is the most redundant, and with the refrigerant charging amount that was judged during the portion of the air-conditioning cycle when the liquid level L is the lowest (i.e., when the condensation pressure is high and the density of the liquid in liquid pipe 8 is large).

Figure 3:
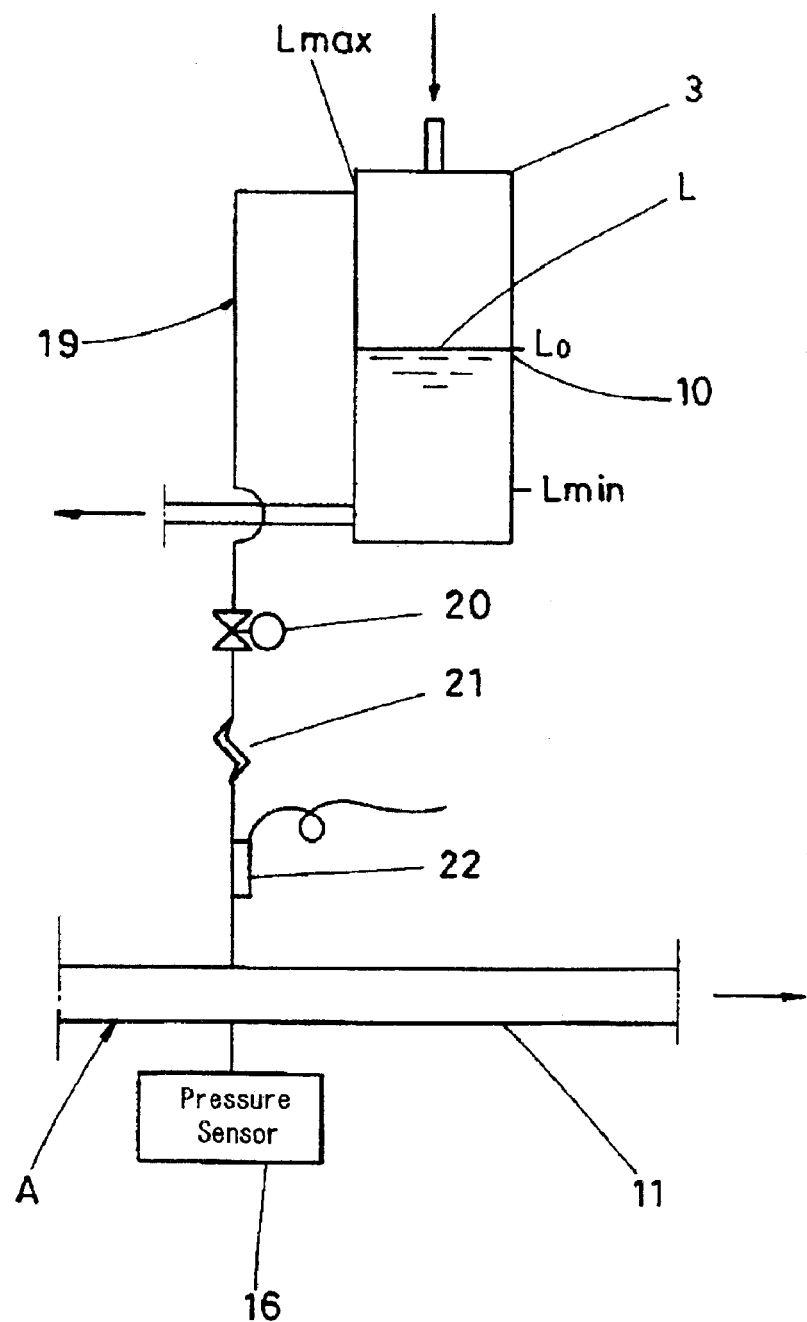
FIG. 3 is an enlarged view of key components of another embodiment of a refrigeration apparatus in accordance with the present invention.

There are conventional refrigeration apparatuses that, as shown in FIG. 3, are provided with a bypass circuit 19 that connects the top edge part Lmax of receiver 3 with suction pipe 11 of compressor 1 and has a solenoid ON/OFF valve 20 and a capillary tube 21. This bypass circuit acts as a protection device during defrost operation, but refrigerant overcharging can be detected by providing bypass circuit 19 with a thermistor 22. In short, a thermistor 22 can be used to detect if the level L of the liquid refrigerant inside receiver 3 has reached a maximum level Lmax during test running after refrigerant charging. In this arrangement, a liquid surface sensor is used as the liquid level detecting means 10.

The embodiments presented herein were described regarding a dedicated air-conditioning device, but the present invention can also be applied to a refrigeration apparatus that is provided with a four-way switching valve on the discharge side of compressor 1 of outdoor unit X so that the flow direction of the refrigerant in refrigeration cycle A can be reversed and both heating and cooling can be performed.

Industrial Applicability

This invention makes it possible to charge a refrigeration apparatus with the amount of refrigerant that the refrigeration apparatus requires at the time of onsite installation. As a result, the optimum refrigerant charging amount can always be obtained.

What is claimed is:

1. A refrigeration apparatus comprising:
   a refrigerant circuit in which the following are connected together:
   an outdoor unit having a compressor that compresses gaseous refrigerant, a heat-source-side heat exchanger connected to the compressor, and a receiver connected to the heat-source-side heat exchanger for collecting liquid refrigerant condensed by the heat-source-side heat exchanger, and
   an indoor unit having an expansion valve and a utilization-side heat exchanger connected to the heat-source-side heat exchanger, a liquid pipe connecting the receiver and the expansion valve together and a gas pipe connecting the utilization-side heat exchanger and the compressor together; and
   a liquid level detecting member that detects if a surface of the liquid refrigerant inside the receiver has reached a prescribed level.

2. A refrigeration apparatus equipped with a refrigerant circuit in which the following are connected together: a compressor that compresses gaseous refrigerant, a heat-source-side heat exchanger, a receiver for collecting liquid refrigerant, an expansion valve, a liquid pipe that connects the receiver and the expansion valve, a utilization-side heat exchanger, and a gas pipe that connects the utilization-side heat exchanger and the compressor; and
   a liquid level detecting member that detects if a surface of the liquid refrigerant inside the receiver has reached a prescribed level,
   the liquid level detecting member comprising a bypass circuit that connects the receiver and a suction side of the compressor and includes an ON/OFF valve and a pressure reducing mechanism and a temperature detecting member that detects a temperature of the refrigerant flowing in the bypass circuit.

3. A refrigeration apparatus equipped with a refrigerant circuit in which the following are connected together: a compressor that compresses gaseous refrigerant, a heat-source-side heat exchanger, a receiver for collecting liquid refrigerant, an expansion valve, a liquid pipe that connects the receiver and the expansion valve, a utilization-side heat exchanger, and a gas pipe that connects the utilization-side heat exchanger and the compressor;
   a liquid level detecting member that detects if a surface of the liquid refrigerant inside the receiver has reached a prescribed level;
   a refrigerant charging operation control member that executes charging of the refrigerant circuit with refrigerant while creating a refrigerant charging operation state in which the liquid pipe of the refrigerant circuit is filled with liquid refrigerant having a prescribed density; and
   a refrigerant charging ending member that ends the refrigerant charging by the refrigerant charging operation control member based on a detection signal from the liquid level detecting member.

4. The refrigeration apparatus as recited in claim 3, wherein
   the heat-source-side heat exchanger is an air-cooled heat exchanger that uses air supplied from an outdoor fan as the heat source; and
   the refrigerant charging operation control member controls the outdoor fan such that a condensation pressure of the heat-source-side heat exchanger which acts as a condenser achieves a prescribed value and controls opening of the expansion valve such that a prescribed degree of superheating can be imparted to the refrigerant at an outlet of the utilization-side heat exchanger which acts as an evaporator.

5. The refrigeration apparatus as recited in claim 2, wherein the following are further provided:
   a refrigerant charging operation control member that executes charging of the refrigerant circuit with refrigerant while creating a refrigerant charging operation state in which the liquid pipe of the refrigerant circuit is filled with liquid refrigerant having a prescribed density; and
   a refrigerant charging ending member that ends the refrigerant charging by the refrigerant charging operation control member based on a detection signal from the liquid level detecting member.

6. The refrigeration apparatus as recited in claim 5, wherein
   the heat-source-side heat exchanger is an air-cooled heat exchanger that uses air supplied from an outdoor fan as the heat source; and
   the refrigerant charging operation control member controls the outdoor fan such that a condensation pressure of the heat-source-side heat exchanger which acts as a condenser achieves a prescribed value and controls opening of the expansion valve such that a prescribed degree of superheating can be imparted to the refrigerant at an outlet of the utilization-side heat exchanger which acts as an evaporator.

7. A refrigeration apparatus comprising:
   a refrigerant circuit in which the following are connected together: a compressor that compresses gaseous refrigerant, a heat-source-side heat exchanger, a receiver for collecting liquid refrigerant, an expansion valve, a liquid pipe that connects the receiver and the expansion valve, a utilization-side heat exchanger, and a gas pipe that connects the utilization-side heat exchanger and the compressor; and
   a liquid level detecting member arranged and configured to extract a part of the liquid refrigerant collected in the receiver, conduct pressure reducing evaporation to the extracted liquid refrigerant, and detect if a surface of the liquid refrigerant in the receiver has reached a prescribed level by evaluating a temperature of the evaporated refrigerant.

* * * * *